(12) United States Patent
Romano et al.

(10) Patent No.: US 6,460,089 B1
(45) Date of Patent: Oct. 1, 2002

(54) METHOD AND SYSTEM FOR EXTENDING FUNCTIONALITY OF A MANAGEMENT CONSOLE

(75) Inventors: Anthony C. Romano, Redmond; Ravishankar K. Rudrappa, Bellevue; Derek Jacoby, Snohomish; S. David Burggraaf; Jonathan S. Newman, both of Redmond; Daniel Plastina, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,741

(22) Filed: Sep. 21, 1998

(51) Int. Cl.[7] .................................................. G06F 9/54
(52) U.S. Cl. ..................................... 709/310; 709/315
(58) Field of Search ................................. 709/310–400, 709/315

(56) References Cited

U.S. PATENT DOCUMENTS

| | | | | |
|---|---|---|---|---|
| 5,903,728 A | * | 5/1999 | Semenzato | 709/217 |
| 5,913,037 A | * | 6/1999 | Spofford et al. | 709/226 |
| 5,983,228 A | * | 11/1999 | Kobayashi et al. | 707/10 |
| 6,006,279 A | * | 12/1999 | Hayes | 709/302 |
| 6,026,440 A | * | 2/2000 | Shrader et al. | 709/224 |
| 6,154,744 A | * | 11/2000 | Kenner et al. | 707/10 |
| 6,167,404 A | * | 12/2000 | Morcos et al. | 707/102 |
| 6,173,289 B1 | * | 1/2001 | Sonderegger et al. | 707/103 |
| 6,192,405 B1 | * | 2/2001 | Bunnell | 709/202 |

OTHER PUBLICATIONS

Microsoft Corporation, *Microsoft Management Console: Snap–In User Interface Guidelines,* 1997.

* cited by examiner

*Primary Examiner*—St. John Courtenay, III
*Assistant Examiner*—Van H. Nguyen
(74) *Attorney, Agent, or Firm*—Leydig, Voit & Mayer, Ltd.

(57) ABSTRACT

A method and system for extending the functionality of a management console uses a data object as a carrier to pass context information of an extended snap-in of the management console to an extension snap-in to enable the extension snap-in to provide extension functionality. The extension snap-in is registered with an information store as an extension of the extended snap-in. When the extended snap-in is invoked to provide management behavior, it creates a data object that exposes the context information using pre-selected clipboard formats. The extension snap-in is identified by referring to the information store, and the data object is passed to the extension snap-in. The extension snap-in obtains the context information from the data object using the pre-selected clipboard formats and performs its management behavior according to the received context information.

11 Claims, 6 Drawing Sheets

METHOD AND SYSTEM FOR EXTENDING FUNCTIONALITY OF A MANAGEMENT CONSOLE

FIELD OF THE INVENTION

This invention relates generally to operating systems, and more particularly to a management console that uses snap-ins to provide management functionality.

BACKGROUND OF THE INVENTION

In the development of new operating systems, significant emphasis has been put on providing improved flexibility in the configuration and extensibility of functionality without compromising the integrity of interface and administration of the operating system. Independent software vendors are encouraged to develop their own modules that can be integrated with the operating system to provide various functionality while retaining the feel and look of a uniform user interface.

One example of software developed with such emphasis in mind is the management console of the recent version of the Windows NT operating system by Microsoft Corporation. The management console is a common console framework for management applications. The management console itself does not supply any management behavior, but instead provides a common environment for software modules commonly called "snap-ins" that may be designed by independent software vendors (ISVs). The snap-ins define the actual management behavior available to an administrator through the management console. The management console organizes and coordinates the snapins and provides an integrated user interface through which the administrator can invoke the snap-ins to provide their respective management behavior.

The flexibility and extensibility of the management console is significantly enhanced by allowing the inclusion of snap-ins called "extension snap-ins" that extend the functionality of other existing snap-ins. In order to provide its extension functionality, an extension snap-in has to be given information of the context in which the snap-in to be extended has been invoked. For example, a Computer Management snap-in may be invoked to provide information about a computer, and an Event Logs snap-in may extend the functionality of the Computer Management snap-in by providing views of the event logs of that computer. Before the Event Logs snap-in can provide the log views, it has to know which computer is being looked at by the Computer Management snap-in.

The open architecture of the management console, however, makes it difficult to require or implement direct communication between the snap-in being extended and the extension snap-in for passing context information. Not only that the snap-ins involved may be designed by different ISVs; they may also be developed at different times. Thus, the snap-in being extended may not know how the extension snap-ins want to extend its functionality or even the existence of such extension snap-ins. It would not be feasible to require that a snap-in be modified to handle the passing of context information every time a new extension snap-in is added to the management console to extend its functionality. Moreover, the use of any non-standardized ways to pass context information between snap-ins would tend to compromise the integrity and manageability of the management console. There is therefore a need for a uniform way to pass context information from a snap-in to be extended to an extension snap-in that does not require the former to have any knowledge about the latter. Such a way to pass context information should not only be simple and efficient in operation but also be easy to implement by the developers of snap-ins.

SUMMARY OF THE INVENTION

In accordance with the present invention, there is provided a method and system that provides a uniform way to pass context information from an extended snap-in of a management console to an extension snap-in to enable the extension snap-in to provide extension functionality. The extension snap-in is recorded in a registry as intended to extend the functionality of the extended snap-in. When the extended snap-in is selected to provide its management functionality, it generates a data object that carries the context information. This data object is then passed to the extension snap-in. The extension snap-in obtains the context information from the data object and provides extension functionality according to the context information.

The advantages of the invention will become apparent with reference to the following detailed description when taken in conjunction with the drawings in which:

BRIEF DESCRIPTION OF THE DRAWINGS

FIG. 4 is a schematic diagram showing the passing of context information carried in a data object from an extended snap-in to an extension snap-in;

Figure 1:
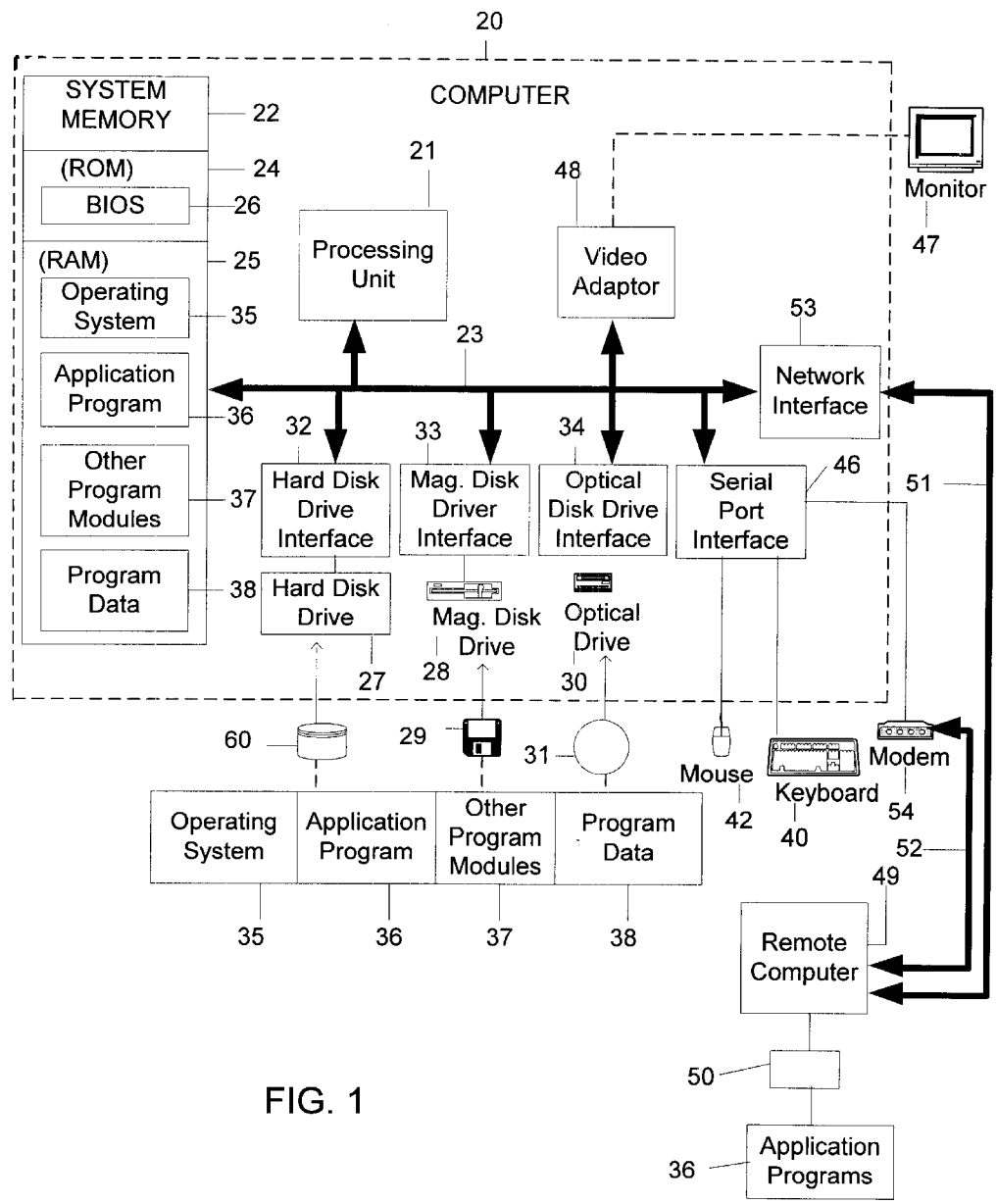
FIG. 1 is a block diagram of a computer system that may be used to implement a method and system that uses snap-ins with a management console to provide extended management functionality according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. n addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
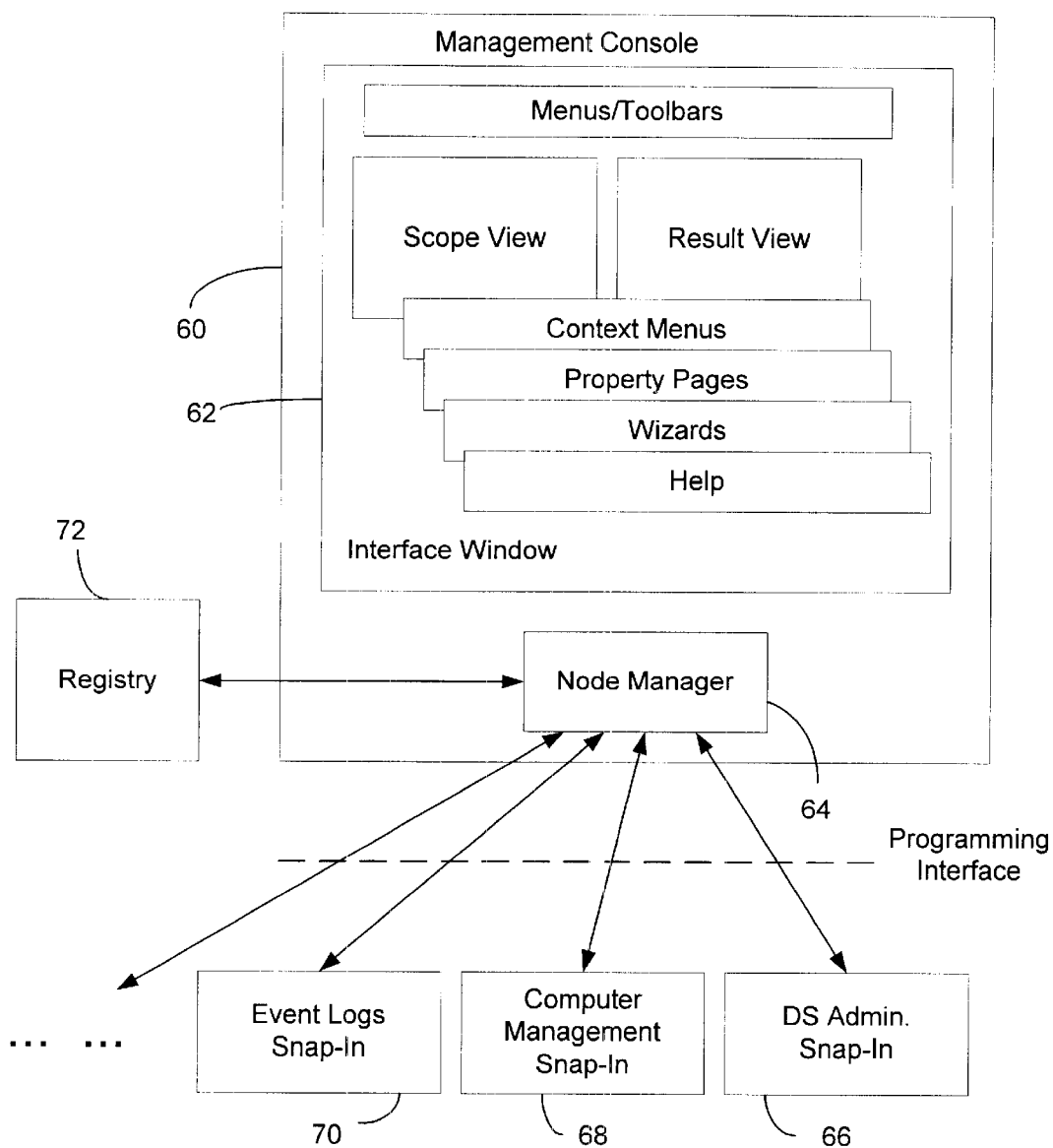
FIG. 2 is a schematic diagram showing a management console that uses snap-ins to provide management functionality.

The present invention relates to the use of snap-ins with a management console to provide management functionality. FIG. 2 shows the general architecture of an embodiment of a management console 60. Generally, the management console 60 is an application that provides a collection of management functionality for administrating the operation of a computer system. For example, the management console may be used to show the computers in a network, or the users of a specified server in a distributed system.

In a preferred embodiment, the management console 60 is designed to be an extensible console framework that does not provide any management functionality by itself. Instead, the management functionality is provided by a plurality of software modules that are called "snap-ins." The snap-ins may be developed by the developer of the operating system or by independent software vendors (ISVs). The snap-ins form management functionality components that are integrated into a common host—the management console. Each snap-in provides one unit of management behavior. Technically, in a preferred embodiment, a snap-in is a Component Object Model (COM) In-proc server that executes in the process context of the management console. The snap-in may call on other supporting controls and dynamic link libraries (DLLs) to accomplish its task. The use of snap-ins in a common console framework allows a system administrator to extend and customize the console to meet specific management objectives by the inclusion and integration of selected snap-ins, which may be provided by different vendors.

As shown in FIG. 2, the management console 60 includes a user interface 62 for selecting a management behavior provided by the snap-ins, and a node manager 64 to interact with snap-ins and to coordinate the operations of the snap-ins through specified programming interfaces. The snap-ins 66, 68, 70 to be used with the management console are registered with a registry 72 of the operating system, and graphic interface items corresponding to the snap-ins may be placed in the user interface window of the management console. When the user selects a management behavior through the interface window, the node manager 64 invokes the corresponding snap-in to provide the selected management behavior.

Figure 3:
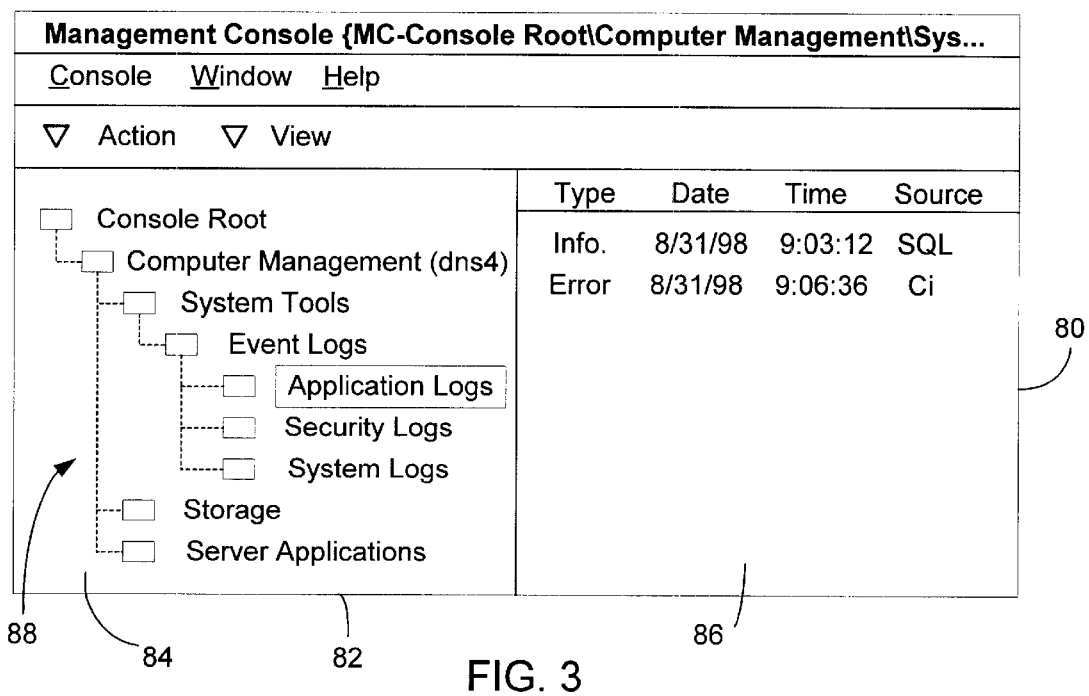
FIG. 3 is a schematic diagram showing a user interface window of the management console with nodes for invoking snap-ins.

FIG. 3 shows an example of the user interface window 80 of the management console. In this example, the interface window 80 includes a child window 82 that has a "scope pane" 84 and a "result pane" 86. The scope pane 84, which is in the left part of the window, displays a tree-formatted listing 88 of visible nodes. This tree of nodes is referred to as the "namespace" of the management console. Each node in the namespace represents a manageable object, task, or view. The result pane 86 of the child window displays the result of selecting a node in the scope pane 84. Depending on the nature of the selected node, the result pane 86 may show, for example, a listing of the contents of a folder represented by the node, a management-related view such as a performance graph, or other types of information.

By way of example, the tree 88 in the scope pane 84 of child window in FIG. 3 includes a Console Root folder node, under which is a node named "Computer Management." The Computer Management node in turn has three child nodes named "System Tools," "Storage," and "Server Applications," which have their respective child nodes. In the illustrated example, a child node "Application Log" of an Event Logs node is selected, and a listing of the events in the application log of the computer being managed by the Computer Management snap-in is displayed in the result pane 86.

Generally, there are two types of snap-ins: stand-alone snap-ins and extension snap-ins. A stand-alone snap-in is a snap-in that is able to provide management functionality even if it is loaded alone in the management console that has no other snap-ins. In contrast, an extension snap-in is a snap-in that is designed to provide functionality when extending another existing snap-in. It will be appreciated that these two types of snap-ins are not mutually exclusive. A snap-in may offer stand-alone functionality and at the same time also extend the functionality of other snap-ins. For example, the Event Logs snap-in which shows the entries in the event logs of computers may function as an extension for the Computer Management snap-in that is invoked for managing a given computer. Alternatively, the Event Logs snap-in can also operate in a stand-alone mode, in which case an administrator has to manually provide the name of the computer of which the event logs are to be viewed with the Event Logs snap-in.

In the description herein, in the context of extending the functionality of snap-ins, a snap-in being extended is referred to as an "extended snap-in" to distinguish it from the extension snap-ins that extend its functionality. The extended snap-in may be a standalone snap-in or an extension snap-in that extends the functionality of other snap-ins.

There are various modes of extensibility for the snap-ins to provide their management behavior. For example, an extension snap-in can add nodes to the namespace as child nodes of a node corresponding to the extended snap-in so that it can be invoked directly by the user. Alternatively, a snap-in may be designed to extend an existing node with new menus, toolbars, property pages, wizards, or the Help feature, without adding any node of its own to the namespace of the management console.

To allow an extension snap-in to extend the functionality of an extended snap-in, the extension snap-in has to know the context in which the extended snap-in has been invoked. It is therefore necessary to pass context information from the extended snap-in to the extension snap-in. The term "context information" is used herein to broadly refer to context dependent data that are required for the extension snap-in to properly perform its task as an extension of the extended snap-in.

By way of example, FIG. 3 shows a scenario in which an extension snap-in provides context-dependent extension functionality to an extended snap-in. In the illustrated example, the Computer Management snap-in has been invoked to provide information regarding a computer named "dns4." The Computer Management snap-in places in the scope pane 84 of the window 82 a node named "Computer Management" and three child nodes named "System Tools," "Storage," and "Server Application," respectively. Under the System Tools node is a node named "Event Logs" that is inserted in the namespace by an Event Logs snap-in. The Event Logs snap-in extends the management functionality of the Computer Management snap-in by showing in the result pane 86 the events in the application log, security log, and/or system log of the computer being looked at by the Computer Management snap-in.

In this example, the Computer Management snap-in could be looking at any computer in a distributed system. In order to provide its management behavior as an extension of the Computer Management snap-in, the Event Logs snap-in needs to know the context in which the Computer Management snap-in was invoked. The context information in this case would include at least the identification of the computer dns4, and may include other information to be used by the Event Logs snap-in to tailor its behavior, such as displaying only events in connection with an SQL server. It will be appreciated that with different extended snap-ins invoked in different contexts, different types of context information will have to be passed to extension snap-ins to enable them to properly provide their functionality.

As described earlier in the background section, it is difficult and undesirable to require the extended snap-in to handle the passing of context information directly to the extension snap-in. The extended snap-in may not even know the existence of the extension snapins. Accordingly, the way the context information is passed has to be standardized and independent of the extension snap-ins. Moreover, the way to pass context information should be efficient and easy to implement.

In accordance with the invention, there is provided a uniform way to pass context information from extended snap-ins to respective extension snap-ins that uses data objects as carriers of the context information. More particularly, a data object carrying the context information is passed from the extended snap-in to the management console, and the management console forwards the data object to any extension snap-in that wants to extend the functionality of the extended snap-in. In some cases, the management console may create an intermediary data object offering a different interface or appending additional information. The extension snap-in obtains the context information from the data object and then decides whether to provide extension functionality based on the context information received.

Figure 4:
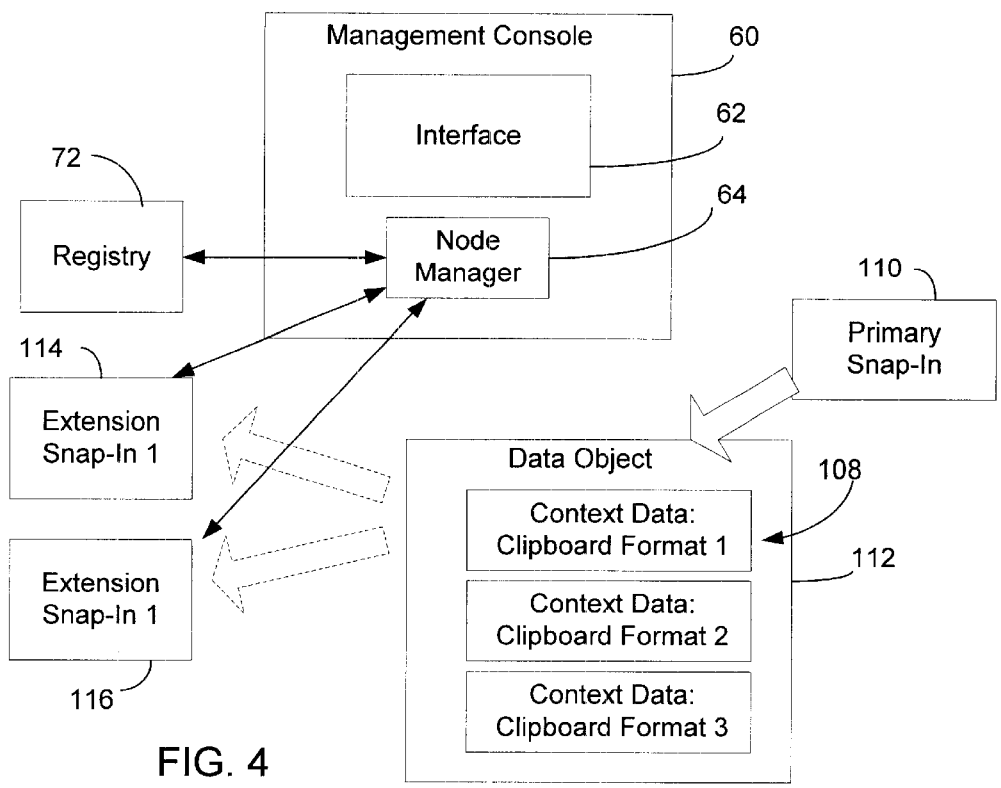

In a preferred embodiment, the passing of the data object is coordinated by the node manager of the management console. Referring to FIG. 4, when the node in the namespace of the management console interface 62 corresponding to the extended snap-in is selected, the node manager 64 invokes the extended snap-in 110 to provide its management behavior and also to generate a data object 112 that carries the context information. The data object 112 exposes the context information in specific pre-selected formats. This data object is then passed by the node manager 64 to all extension snap-ins that wish to extend the functionality of the extended snap-in 110.

Figure 5:
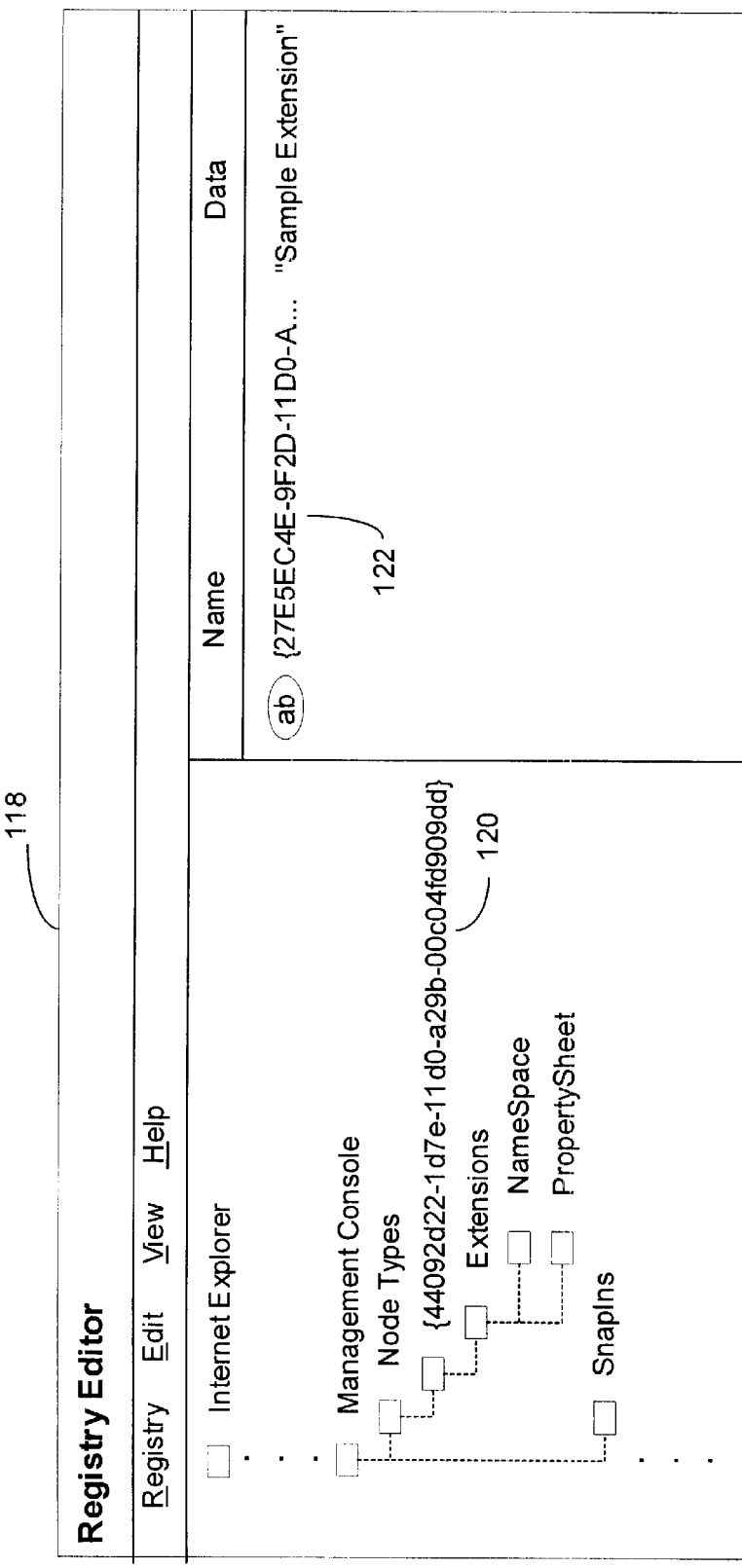
FIG. 5 is a schematic diagram showing a user interface window representing the contents of a system registry for registering snap-ins.

To enable the node manager 64 to identify the extension snap-ins 114, 116 for the extended snap-in 110, all extension snap-ins are preferably recorded in an information store that is accessible by the node manager to retrieve information regarding the snap-ins. In a preferred embodiment, all stand-alone and extension snap-ins are registered with a system registry of the operation system. FIG. 5 shows an exemplary view of an interface window 118 of the registry showing the organization of the registered information. As illustrated in FIG. 5, the registry has a tree-formatted listing of folders commonly referred to as "keys." The management console is represented as a "Management Console" folder key with two child keys named respectively the "Node Types" folder and the "SnapIns" folder. The Node Types folder contains all node types that are visible in the namespace of the interface window of the management console. Each node type is identified by a class identifier (CLSID) which is a globally unique identifier (GUID). In a preferred embodiment, each CLSID is 128-bit long. For simplicity of illustration, only the CLSID of one node type 120 is shown in FIG. 5.

The SnapIns folder is for storing information for all snap-ins (stand-alone and extension) registered with the registry 72 for use in the management console 60. As illustrated, the node type 120 has a child key called the "Extensions" folder for storing information about snap-ins that want to extend the functionality of that node type. The Extensions key further has two child keys named the "Namespace" folder and the "PropertySheet" folder. The "Namespace" folder is for storing information about extension snap-ins that want to add their own nodes to the namespace of the management console in the tree under the node to be extended. The PropertySheet folder contains information about extension snap-ins that want to add property pages is to the property sheet of the node type 120. The result of selecting the PropertySheet folder is shown in the scope panel. In the illustrated example, the PropertySheet folder contains only one extension snap-in 122 registered for adding a page to the property sheet of the node type 120. The extension snap-in 122 is identified by its CLSID and additional descriptive data. In this example, for simplicity of illustration, the Extensions folder is shown to contain only two child folders for two respective modes of extensibility. It will be appreciated that there may be other child folders for snap-ins with other modes of extensibility, such as providing new menus, toolbars, wizards, or Help, etc., to the node type being extended.

When a snap-in (stand-alone or extension) is registered with the registry, appropriate information about it is stored in the SnapIns folder. The node types to be placed by the snap-in the management console namespace are stored separately in the Node Types folder. This arrangement allows the retrieval of registered information by the node manager to be more efficient because the extension is based on node types. If it is indicated that the snap-in being registered is to extend the functionality of a given node type, the snap-in is also registered in an appropriate child folder of the extension folder of that node type according to the mode of extensibility provided by the snap-in.

Referring again to FIG. 4, when a node placed in. the namespace of the interface window of the management console is selected, the corresponding snap-in is invoked by the node manager. In a preferred embodiment, the management console 60 and snap-ins are implemented according to the well-known Component Object Model (COM). When an extended snap-in 110 is invoked, the node manager 64 uses the CLSID of the extended snap-in to cause an instance of the extended snap-in to be created. The extended snap-in 110 is then required to create a data object 112 that exposes the context information in one or more pre-selected formats. When the functionality of the extended snap-in 110 is to be extended, the node manager 64 refers to the registry 72 to obtain the CLSIDs of extension-snips 114, 116 that have been registered to extend the node type of the extended snap-in a specified mode of extensibility. For example, when the administer selects the "Properties" entry of the context menu of a node in the namespace of the management console, the node manager checks the "PropertySheet" folder under the given node type in the registry to identify all extension snap-ins that want to add property pages to the property sheet of the that node. After obtaining the CLSIDs of the extension snap-ins 114, 116, the node manager 64 causes instances of the respective extension snap-ins to be created and obtains their interface pointers. The node manager 64 then passes the data object 112 created by the extended snap-in 110 as parameters to the respective extension snap-ins. Each extension snap-in obtains the context information from the data object 112 and provides its management functionality based on the received context information.

For an extension snap-in to understand the context information in the data object, the extension snap-in has to know the format or formats in which the context information is exposed by the data objects. In a preferred embodiment, to facilitate the efficient transfer of context information, the data object 112 exposes data 108 representing the context information using clipboard formats. More particularly, the developer of the extended snap-in 110 publishes information regarding the extended snap-in, including its CLSID, the node types it places in the namespace and their respective CLSIDs, and the clipboard formats used by the data object it creates to expose context information. The clipboard formats may be standard clipboard formats or private clipboard formats. Such information may be published in a repository at a dedicated site of the World Wide Web on the Internet. When an ISV wants to develop an extension snap-in for a given extended snap-in, it obtains the published information regarding the extended snap-in from the repository and designs the extension snap-in to obtain the context information from the data object in the clipboard formats specified for the extended snap-in.

Although clipboard formats are used in a preferred embodiment to expose context data, the passing of context information according to the invention does not involve the conventional clipboard mechanism well known to those skilled in the art. The clipboard mechanism requires manual input from the user for cutting and pasting operations. In contrast, the passing of context information according to the invention is automatic under the control of the management console. It will be appreciated that an important benefit of using the clipboard format mechanism is in reusing an existing protocol for defining mutually understandable data formats.

Figure 6:
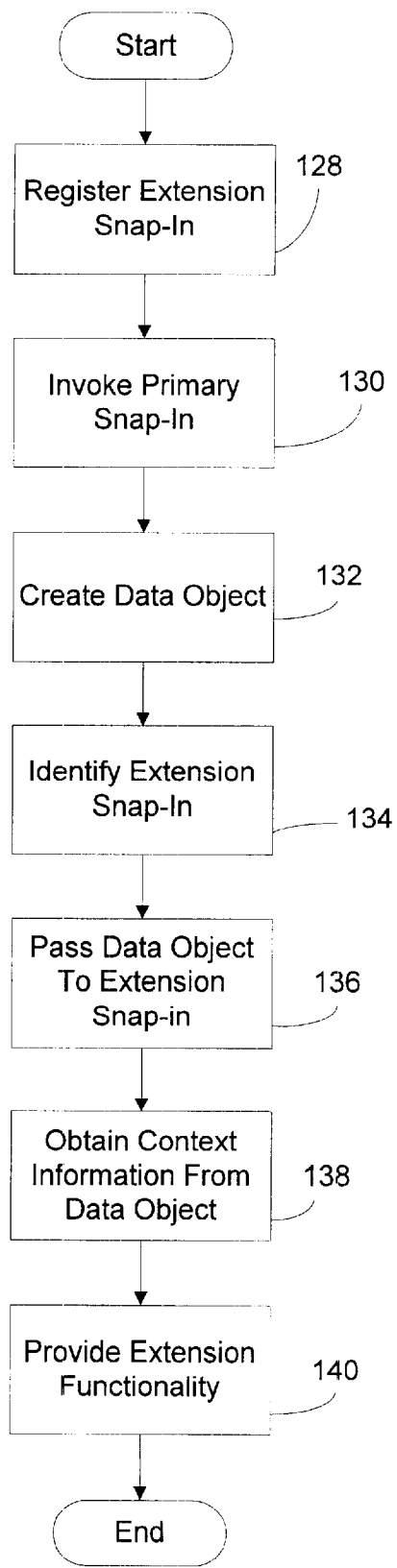
FIG. 6 is a flow chart showing a process of passing context information to an extension snap-in to enable it to provide extension management behavior.

The use of extension snap-ins for providing context-dependent extension functionality in the embodiment described above is summarized in FIG. 6. Extension snap-ins designed to extend the functionality of an extended snap-in are registered with a system registry (step 128). When the extended snap-in is invoked to provide management behavior (step 130), it creates a data object at a specified time, which exposes the context information in pre-selected clipboard formats (step 132). The node manager then obtains the CLSIDs of the extension snap-ins that want to extend the extended snap-in a specific extension mode by referring to the registry (step 134). The CLSIDS enables the creation of the respective instances of the extension snap-ins. The node manager then passes the data object to each of the extension snap-ins (step 136). Each of those extension snap-ins obtains the context information from the data object using the pre-selected clipboard formats (step 138), and provides its extension management functionality according to the received context information (step 140).

In view of the foregoing detailed description, it can be appreciated that the invention provides a uniform way to pass context information from an extended snap-in to an extension snap-in so that the latter can provide context-dependent extension management functionality. By virtue of the use of a data object as the vehicle for the context information, context information can be passed from the extended snap-in to the extension snap-in without requiring the extended snap-in to know anything about the extension snap-in. As a result, primary and extension snap-ins developed by different ISVs and at different times can be seamlessly integrated in the management console to provide flexible and extensible management functionality without compromising the simplicity of the user interface and the ease of use of the management console.

What is claimed is:

1. A method of extending functionality of an extended snap-in of a management console with an extension snap-in, comprising the steps of:

generating, by the extended snap-in, a data object carrying context information;

passing the data object to the extension snap-in;

obtaining, by the extension snap-in, the context information from the data object;

providing, by the extension snap-in, extension functionality according to the context information.

2. A method as in claim 1, wherein the data object exposes the context information using at least one clipboard format.

3. A method as in claim 1, further including the step of identifying the extension snap-in by referring to an information store.

4. A method as in claim 1, wherein the extended snap-in generates the data object in response to a user selection of a node in a user interface that corresponds to the extended snap-in.

5. A computer-readable medium having computer-executable instructions for performing steps comprising:

registering an extension snap-in with an information store as intended to provide extension functionality to an extended snap-in of a management console;

generating, by the extended snap-in, a data object carrying context information;

passing the data object to the extension snap-in;

obtaining, by the extension snap-in, the context information from the data object;

providing, by the extension snap-in, extension functionality according to the context information.

6. A computer-readable medium as in claim 5, wherein the context information is exposed by the data object using at least one clipboard format.

7. A computer-readable medium having computer-executable components comprising:

an information store component for registering an extension snap-in for providing extension functionality to an extended snap-in of a management console;

a manager for passing a data object generated by the extended snap-in and carrying context information to the extension snap-in to allow the extension snap-in to provide extension functionality according to the context information.

8. A method of extending functionality of an extended snap-in of a management console with an extension snap-in, comprising the steps of:

recording the extension snap-in an information store as intended to provide extension functionality to the extended snap-in;

selecting the extended snap-in for providing management functionality;

generating, by the extended snap-in, a data object carrying context information;

identifying the extension snap-in by referring to the information store;

passing the data object to the extension snap-in;

obtaining, by the extension snap-in, the context information from the data object;

providing, by the extension snap-in, extension functionality according to the context information.

9. A method as in claim 8, wherein the data object exposes the context information using at least one clipboard format.

10. A computer-readable medium having computer-executable instructions for performing steps comprising:

recording an extension snap-in an information store as intended to provide extension functionality to an extended snap-in of a management console;

selecting the extended snap-in for providing management functionality;

generating, by the extended snap-in, a data object carrying context information;

identifying the extension snap-in by referring to the information store;

passing the data object to the extension snap-in;

obtaining, by the extension snap-in, the context information from the data object;

providing, by the extension snap-in, extension functionality according to the context information.

11. A system for providing management functionality, comprising:

an extended snap-in for providing management functionality;

an extension snap-in for providing extension functionality to the extended snap-in;

an information store for registering the extension snap-in as providing extension functionality to the extended snap-in;

a management console for providing user interface for invoking the extended snap-in to provide management functionality and having a manager for passing a data object generated by the extended snap-in and carrying context information to the extension snap-in to allow the extension snap-in to provide extension functionality.

* * * * *

UNITED STATES PATENT AND TRADEMARK OFFICE
CERTIFICATE OF CORRECTION

PATENT NO. : 6,460,089 B1
DATED : October 1, 2002
INVENTOR(S) : Anthony C. Romano et al.

It is certified that error appears in the above-identified patent and that said Letters Patent is hereby corrected as shown below:

Column 3,
Line 65, "n addition" should read -- In addition --.

Column 7,
Line 38, "pages is to" should read -- pages to --.
Line 54, "snap-in the" should read -- snap-in in the --.

Column 8,
Line 11, "snap-in a" should read -- snap-in in a --.

Column 9,
Line 3, "snap-in a" should read -- snap-in in a --.

Column 10,
Line 33, "snap-in an" should read -- snap-in in an --.

Signed and Sealed this

Eighteenth Day of March, 2003

JAMES E. ROGAN
*Director of the United States Patent and Trademark Office*